United States Patent [19]

Cory et al.

[11] Patent Number: 5,250,191
[45] Date of Patent: Oct. 5, 1993

[54] PAINT DENATURANT

[75] Inventors: Michael Cory, High Wycombe; Ziegmund Zoltowski, Kingston, both of England

[73] Assignee: Brent Chemicals International plc, United Kingdom

[21] Appl. No.: 903,375

[22] Filed: Jun. 24, 1992

[30] Foreign Application Priority Data

Jun. 24, 1991 [GB] United Kingdom ............... 9113568

[51] Int. Cl.$^5$ .............................................. B01D 17/04
[52] U.S. Cl. .................................... 210/712; 95/253; 95/196; 95/197; 210/930
[58] Field of Search .................. 55/45, 84, 85, 86, 89; 210/712, 930

[56] References Cited

U.S. PATENT DOCUMENTS

| | | | |
|---|---|---|---|
| 2,267,426 | 10/1938 | Saunders et al. | 106/287 |
| 2,362,964 | 11/1944 | Affleck. | |
| 2,585,407 | 2/1952 | Rives. | |
| 3,515,575 | 6/1970 | Arnold | 117/102 |
| 3,861,887 | 1/1975 | Forney | 55/19 |
| 3,990,936 | 11/1976 | Gabel et al. | 252/315 |
| 4,380,495 | 4/1983 | Maher | 210/728 |
| 4,629,572 | 12/1986 | Leitz et al. | 210/714 |
| 4,637,824 | 1/1987 | Pominville | 55/85 |
| 4,687,520 | 8/1987 | Seng | 106/271 |
| 4,692,263 | 9/1987 | Eberhardt et al. | 252/122 |
| 4,699,730 | 10/1987 | Miles et al. | 252/181 |
| 4,750,919 | 6/1988 | Patzelt et al. | 55/85 |
| 4,853,132 | 8/1989 | Merrell et al. | 210/712 |
| 4,861,491 | 8/1989 | Svensson. | |
| 4,933,091 | 6/1990 | Geke et al. | 210/712 |
| 5,006,261 | 4/1991 | Huang et al.. | |
| 5,034,136 | 7/1991 | Cody et al.. | |

FOREIGN PATENT DOCUMENTS

| | | |
|---|---|---|
| 0293129 | 11/1988 | European Pat. Off.. |
| 0294810 | 12/1988 | European Pat. Off.. |
| 0306628 | 3/1989 | European Pat. Off.. |
| 2011371 | 7/1979 | United Kingdom. |

Primary Examiner—Charles Hart
Attorney, Agent, or Firm—Harris, Kern, Wallen & Tinsley

[57] ABSTRACT

This invention relates to a process for detackifying and dispersing paint solids for example obtained from paint overspray in enclosed areas such as paint spray booths.

The process includes contacting an oil-in-water emulsion with an aqueous solution whereby the oil-in-water emulsion is destabilised. On subsequent contact of paint particles with the aqueous solution comprising the destabilised oil-in-water emulsion, the paint is adsorbed on to destabilised emulsion particles. The process provides an effective method of denaturing paint over-spray which is easily handleable and effective over a wide range of paint compositions.

In one embodiment of the invention, the oil-in-water emulsion comprises a latex.

21 Claims, No Drawings

PAINT DENATURANT

The present invention relates to a process and composition for detackifying and dispersing paint solids for example obtained from paint overspray in enclosed areas such as paint spray-booths.

In modern paint technology automatic spraying techniques are often used for painting large articles or parts of articles, for example in the automotive industry or for articles such as refrigerators. In paint spray-booths there is a large amount of paint overspray which does not contact the article being painted and this is usually collected in water by means of a water curtain flowing through the booth or by other, similar arrangements.

Generally, the water collecting the paint overspray is recycled and in order to ensure that the process continues to work efficiently, the paint must be collected and removed from the booth. There is therefore a need to detackify the oversprayed paint so that it can be removed easily, to enable filtration and recirculation of water through the system. Preferably, in addition, coagulation of the over-sprayed paint is promoted so that the paint solids will either float so that they can be removed from the surface of the aqueous liquid in the spray-booth, or the paint solids will sink so that they can be removed by sedimentation.

The detackifying process (also known as paint denaturing or paint killing) takes place in the water phase, by means of chemicals added to the water itself. In addition, detackification is necessary because it prevents paint fouling the internal surfaces of the booth and of pipes, which may cause blockages. Collection of paint on the internal surfaces is undesirable because paint deposits formed on the internal walls of the booth are subject to the growth of anaerobic bacteria which generate corrosive and foul-smelling substances due to anaerobic decomposition of organic substances.

Preferably a detackification composition for use in a paint spray-booth will not promote paint dissolution in water, as this may result in a potential water pollution problem. Preferably there should also be an anti-foaming effect to counteract undesirable foam formation inside the booth and ideally, compositions for addition to the booth water should also be "bio-resistant" to avoid biological degradation.

In view of the large variety of paint and lacquer compositions which are sprayed in this type of application, preferably the detackification composition is also effective against a wide variety of coating compositions.

Because of the wide variety of properties which are needed for this type of detackification composition, the technology has not yet reached a fully satisfactory level, although there are many available detackification systems. One type of composition in wide spread use, in particular, before the 1980's, was caustic alkali based products. However, as paint technology has become more sophisticated the caustic compositions are ineffective against many modern paint compositions.

One further type of composition presently in use comprise metal salts. The metal salts are added to the booth water along with an alkali such as sodium hydroxide to maintain neutral to slightly alkaline pH as the metal salts give rise to hydroxide flocs by hydrolysis. The paint particles are then adsorbed onto the surface of the hydroxide flocs. Such systems are disadvantageous because the addition of metal ions such as zinc and aluminium poses potential pollution problems and this also produces polluted sludges.

One other type of detackification composition which is in widespread use comprise for example talc or clay comprising small particles of high surface area to which the paint can adsorb. For example U.S. Pat. No. 2,267,426 describes the use of colloidal suspensions of graphite or talc for precipitation and collection of oversprayed paint. The compositions are prepared by mixing dry talc with water to form a paste followed by the addition of linseed oil. Such clay based products while providing a good paint killing system are disadvantageous because the small particulate nature of the clay particle makes the product difficult to handle if supplied in the dry form, and if supplied in the slurry form, the solids content is usually less than 20%. In addition, undesirable foam is easily formed and stabilized.

The particles in this type of system are prone to settling out, so when the booth is intended for surface collection of the killed paint undesired precipitate is formed at the bottom of the booth. These problems can be overcome by the addition of further chemical components to the composition. However, it is preferable to keep the number of ingredients as low as possible because as the aqueous liquid in the booth circulates, certain components in the mixture will become exhausted and need replenishing. Since the components will be exhausted at different rates, increasing the number of components in the composition results in difficult and time consuming replenishment and control of the composition in the recirculating water in the booth. One example of this type of clay-based composition is described in U.S. Pat No. 4,380,495. The composition disclosed comprises clays, oils, rubbery material and foam suppressant.

One further disadvantage of clay-based compositions is that the pipes and surfaces are easily fouled as polymeric flocculants are often added in substantial amounts. In addition, clay based products do not work effectively on certain types of paints such as clear topcoats.

Polymer based products are also used as paint denaturants. They provide good paint flotation compositions but are unsuitable for sinking. However, they often promote foam and the paint killing is often unacceptably poor. Due to the stickiness of the polyelectrolytes which are used, the pipes and surfaces can easily be fouled. Examples of polymeric detackification compositions can be found in EP 293129, U.S. Pat. No. 3,515,575 and U.S. Pat. No. 4,853,132.

In GB-A-2011371 an aqueous dispersion of wax is used in combination with an alkaline solution to collect paint. The wax dispersion may contain surfactants. It is added to alkaline water at pH 13.5 to form a homogeneous dispersion and then used in a paint mist wet separator, i.e. contacted with paint, where the wax particles act as a surface on which the paint can be attacked by alkali. U.S. Pat. No. 4,687,520 describes a dispersion of wax with an organic amine and a non-ionic surfactant useful as a single component paint detackifier. The composition is added to water recirculating in the separator.

In U.S. Pat. No. 4,750,919 a method is described in which the over-sprayed paint solids are contacted with an oil-in-water emulsion until the emulsion is loaded with at least 5 parts by weight of paint solids per 100 parts by weight of the hydrocarbon liquid of the emulsion. This document describes how when used in this way the capacity of the emulsion is not exhausted. The emulsion having received the over-sprayed solids is then removed from the system and the emulsion is broken by adjusting pH. The sludge layer containing paint solids, hydrocarbon liquid, paint carrier and water is removed. The sludge-free hydrocarbon liquid and water layers are recombined with additional emulsion and recycled through the process. Thus, the emulsion remains stable throughout the process until after removal from the system with the paint solids, where it is broken for removal of the paint solids.

As will be seen from the above described systems, there is still a need for an efficient, easily handleable paint detackification composition for use in this type of process. The present invention comprises a detackification system which can be used on a wide variety of paints and which will give efficient detackification.

The present invention provides a process for detackifying paint comprising contacting an oil-in-water emulsion with an aqueous solution whereby the oil-in-water emulsion is destabilised; then contacting paint with the aqueous solution comprising the destabilised oil-in-water emulsion so that the paint is adsorbed onto destabilised emulsion particles.

Thus, the invention provides an improved method of denaturing paint over-spray which is easily handleable and is effective over a wide range of paint compositions. Small, suspended solid particles having high surface area (flocs) which are useful for paint denaturing are provided by destabilisation of an emulsion. The composition is for use in flotation processes where the adsorbed paint and flocs float to the surface of the water in the spray-booth and are removed, for example, by scraping from the surface.

The emulsions which are suitable for use in the present invention can be any oil-in-water emulsion which can be destabilised by addition to an aqueous liquid. Preferably the emulsion can be added to the paint booth water either as a low water content, oily mixture which will spontaneously emulsify and can then be destabilised, or as a concentrated oil-in-water emulsion.

Preferably the hydrophobic oil phase to be emulsified is wax or paraffin based, solid at room temperature, in order to produce high volume flocs after emulsion destabilisation. Most preferably, the oil phase comprises a higher melting point paraffin or wax, having melting point above about 50°, preferably above 60° C., most preferably above 80°. The paraffin or wax can be mixed with a mineral oil or naturally occurring oil or fat in order to reduce the melting point. Stearines (hydrogenated fatty acids) can also be used successfully. Preferred materials comprise waxes or stearines or mixtures of such compounds with up to 30% of oils.

Preferably the hydrophobic phase comprises a wax as this promotes flotation of the flocs producing a more effective separation result. It is believed that separation of the paint from the aqueous liquid in the booth occurs at least in part due to hydrophobic interactions between the hydrophobic phase of the emulsion and the hydrophobic nature of the paint.

It is preferred to use the higher melting point paraffins or waxes, with a mineral or natural oil because the destabilisation is more effective. If the melting point of the non-aqueous phase of the emulsion is too low, the composition can tend towards a situation in which on destabilisation, the non-aqueous phase will separate out as a floating top layer on the aqueous liquid inside the paint booth.

Where a concentrated oil-in-water emulsion is prepared for direct addition to the paint booth water, preferably the ratio of oil phase to aqueous phase in the emulsion is from 1:5 to 5:1, most preferably 1:2 to 2:1.

The emulsifying agent in the emulsion can be any emulsifying agent which is capable of forming a relatively stable oil-in-water emulsion with the non-aqueous phase described above and which will enable the emulsion to be destabilised. Preferably the emulsifier is water-soluble and ionic so that destabilisation can take place by contact with ions of the opposite charge in an amount sufficient to destabilise the emulsion in the aqueous liquid in the paint spray-booth.

The preferred emulsifiers are anionic in nature so that they can be destabilised by the action of a metal ion to provide an insoluble salt. Preferably the anionic emulsifier will form an insoluble salt with calcium and/or magnesium ions and most preferably these are provided by natural water hardness of normal tap water. Where the water hardness is too low to produce the required result or where a different metal ion is required, possible metal salts to be used as sources of metal ions are for example sulphate, chloride, nitrate, acetate of calcium, aluminium, magnesium or iron. Any other metal salt which is water soluble and whose cation gives an insoluble salt with the selected anionic emulsifier can also be used although obviously, it is preferred to use a metal which is not considered to produce water pollution or pollution of the sludge. Thus, water hardness is the preferred source of suitable metal ions.

Examples of other preferred anionic emulsifiers are fatty acid salts of alkali metals, alkanolamines (soaps) or petroleum sulphonate salts of alkali metals or alkanolamines.

Alternatively, the emulsion destabilisation can be achieved by the use of a cationic emulsifier and/or a cationic polymer to destabilise an anionic emulsifier in the emulsion. Any cationic emulsifier or polymer which will destabilise the anionic emulsifier in the emulsion is suitable but nitrogen containing destabilisation polymers could be disadvantageous due to the nitrogen content which could be a potential nutrient for bacterial growth. Detackification and dispersion of paint can however be effective using this type of composition.

Alternatively, the emulsifying agent for the emulsion can be cationic, for example a quaternary ammonium compound having short alkyl chain, preferably from 1 to 8 carbon atoms. When this type of emulsifying agent is used, destabilisation can be effected by the addition of anionic substances for example, anionic polymers, soaps or anionic surfactants.

The oil-in-water emulsion can also be destabilised by any other method. For example, in particular where the emulsion is stabilized using an anionic surfactant, the pH of the aqueous liquid in the spray-booth will generally be from 6.0 to 9.0. In order to destabilise the emulsion, the pH should be lowered by at least 0.5 units to at least pH 5.5, preferably to a pH of from 3.5 to 4.0. pH below 3.5 will produce effective destabilisation but is undesirable as it may lead to corrosion problems.

The oil-in-water emulsion may be a latex i.e. an oil-in-water in-water polymer emulsion preferably with hydrophobic polymer only in the dispersed phase. Suitable latices comprise natural rubber latices, styrene- or butadiene-based, acrylate- or acrylonitrile-based polymer emulsions.

Where the process involves the formation of unstable emulsion and then its addition to water to destabilise, the emulsifying agent should be present in the emulsion in a quantity sufficient to provide a stable emulsion which can be destabilised in the aqueous liquid in the paint spray-booth. Generally, the weight ratio of the oil phase to emulsifying agent is in the range of from 5:95 to 99:1, preferably in the range 5:1 to 1:5. Where the paint detackification composition is provided to the paint spray-booth aqueous liquid in the form of a hydrophobic phase which will emulsify on contact with water, the composition will comprise the oil and emulsifying agent in weight ratios in the range 99:1 to 5:95 preferably 5:1 to 1:15.

The oil-in-water emulsion can be added directly to the aqueous liquid circulating in the paint spray-booth and is preferably used at a concentration of from 0.2 to 30 g, preferably 0.5 g/l to 20 g/l of aqueous liquid in the paint spray-booth, preferably from 1 g/l to 10 g/l. Where the composition is supplied to the paint spray-booth in the form of a concentrated composition comprising hydrophobic phase and emulsifying agent, preferably the quantity is less than that, for example from 0.2 to 10 g preferably 0.5 to 5 g/l. In this case, the order of addition of the oil and emulsifying agent mixture and the addition of the destabilising component, such as metal ions can be either way around.

As explained above, using the composition according to the invention, the flocs and adsorbed paint rise to the surface of the aqueous liquid in the paint spray-booth and can then be removed by scraping the paint-floc mixture from the surface of the liquid. This flotation can be improved by aerating the aqueous liquid flowing through the spray-booth so that as the air rises to the surface of the liquid the flocs are also carried to the surface.

The present invention also comprises use of a destabilised oil-in-water emulsion for paint denaturing.

The invention is described with reference to the following examples:

EXAMPLES

Laboratory tests for paint detackification were carried out using the following method. 1 liter tap water was placed in a beaker at room temperature and mechanical stirring was provided at 1000 rpm so that a vortex was produced which reached almost to the bottom of the beaker. The oil-in-water emulsion was added to the beaker and stirred into the water. 2 g paint was then added dropwise over a 30 second period to the aqueous liquid in the beaker using a pipette. Stirring was carried out for a further three minutes after paint addition and the beaker was then left standing for five minutes. After the five minute standing period, the performance of the paint denaturant was evaluated in terms of paint dispersion, detackification, water turbidity, foaming and the amount of paint floating/sinking.

In order to evaluate the paint dispersion, a "Raft" test is used. The flat end of a metal spatula was used to try to form a square raft from the paint floating on the surface of the liquid in the beaker. The ease of formation of the raft gives an indication of the paint dispersion. If the paint is very highly dispersed the raft will not form. Since the detackified paint will generally be removed from a paint spray booth by skimming the waste paint from the surface of the liquid, the most satisfactory paint dispersion will result in dispersed paint particles which tend to be able to be directed into a square raft form i.e. the paint will be sufficiently well disposed to form a raft easily.

Detackification is evaluated by observation of several factors. Firstly, the amount of paint sticking to the stirrer at the end of the five minute standing period gives an indication of detackification. Obviously, detackification has been more effective if a smaller amount of paint remains on the stirrer. In addition, at the end of the five minute standing period, the liquid in the beaker is gently swirled and the amount of paint stuck to the sides of the beaker is also noted. The "feel" of the surface paint when gently rolled between the fingers also gives an indication of whether detackification has been successfully achieved. This can vary from completely tacky when denaturing has been unsuccessful, through to a stage when some of the paint can be formed into a ball under light finger pressure (partially denatured) to where the whole paint, or some of the fine dispersion, feels sandy (fully denatured).

Foaming is evaluated by noting the amount of foam generated by the stirring period, at the beginning of the five minute standing period. Preferably, there is substantially no foam formation.

The amount of paint floating/sinking is evaluated by observation of the relative proportions of denatured paint floating or having sunk at the end of the five minute standing period.

Correlation of these laboratory tests and performance in paint spray booths depends upon the design and operation of the particular spray booth. Thus, in some systems, paints which after five minutes standing are still tacky and cannot be balled between the fingers can still give good rafts if the dispersion is good. Therefore, they may still be useful in booths where a surface skimmer system is used to remove the denatured paint waste. Conversely, if at this stage, many sandy fines are produced the "raft" test will show that the paint is difficult to guide into a raft and this indicates that in practice in a paint spray booth, the paint will be difficult to remove by the skimming method.

For spray booths in which there is comparatively little agitation, the paint should be at least easily balled, or better still, sandy in feel.

In the examples, the description of good dispersion and good detackification are particularly relevant to spray booths in which the paint wastes are removed by scraping the paint-floc mixture from the surface of the liquid. Thus, good dispersion is that which enables easy formation of a raft in the Raft test and good detackification is when the paint has been detacktified preferably to at least the stage where it can be balled.

EXAMPLE 1

The hydrophobic oil phase was prepared by melting 0.5 g of an oxidized microcrystalline wax having a melting point of approximately 105° C. and adding 0.3 g of a technical white mineral oil having a flash point 174° C. (c.c), viscosity 14.8 Cst 40° C. and 3.5 Cst at 100° C. 1.2 g of a sodium salt of petroleum sulphonate surfactant Petronate L (Trade Mark from Witco Co.) was then added. 50 ml of distilled hot water was then added to produce a stable oil-in-water emulsion. The emulsion was poured into the beaker comprising 1 liter of tap water having a hardness of 280 mg calcium carbonate per liter (28 french degrees of hardness). Immediately the emulsion broke giving rise to a large volume of very light flocs. Five paints were then tested using the test method described above:

a) a "stone chip" polyester primer, grey, high density (approx. 1.3 g/ml) (manufactured by PPG)

b) a normal, low density (0.85 g/ml) polyester primer (manufactured by PPG)
c) a clear polyurethane topcoat (manufactured by BASF)
d) a red acrylic paint (BASF)
e) a black coal-tar epoxy paint (BASF)

In all the case, the results were:
very good dispersion
very good detackification
almost 100% flotation (only trace sedimentation with the primer and the red acrylic paint)
clear solutions
virtually no foam Comparative tests were carried out with a dry form bentonite/clay based product as described in U.S. Pat No. 4,699,730 having the following composition:

10 to 50 parts by weight of bentonite, 15 to 50 parts by weight of kaolin clay, 0 to 35 parts by weight of diatomite, 0.3 to 5 parts by weight of magnesium sulfate and an additive comprising:

67 parts by weight water thoroughly mixed with 0.5 parts by weight polyelectrolyte type of the polyacrylic acid to which is added 32.5 parts by weight of magnesium sulfate. This additive was included in the tank water in an amount of from 0.1 to 10% volume to volume relative to the quantity of the aqueous solution contained in the water recirculating in the system.

The composition according to the invention produced overall results which were much better than the results for the clay-based product. For instance the bentonite/clay based product gave more than 50% sedimentation, a turbid solution and poor detackification with the topcoat, with the red acrylic paint, and with the "stone chip" primer.

EXAMPLE 2

The procedure of Example 1 was repeated but the 1 liter of water in the beaker was deionised and destabilisation took place by means of the addition of 300 ppm calcium (as calcium acetate) prior to addition of the emulsion. Floc formation was as good as in Example 1.

Only the red acrylic paint was tested, with results almost identical to Example 1.

EXAMPLE 3

The procedure of Example 2 was repeated but destabilisation of the emulsion took place by means of the addition of 200 ppm aluminium (as aluminium nitrate) to the water in the beaker prior to addition of the emulsion. Floc formation was as good as in Example 1.

Only the red acrylic paint was tested, with results very similar to those of Example 1.

EXAMPLE 4

The procedure of Example 2, was repeated but destabilisation of the emulsion took place by means of the addition of 100 ppm of a cationic poly-acrylamide, high molecular weight, available on the market as a waste water treatment chemical.

Floc formation was less voluminous than in Example 1, and the solution was still somewhat cloudy.

Only the red acrylic paint was tested, with results similar to those obtained in Example 1; detackification was even better, but the solution remained cloudy.

EXAMPLE 5

The hydrophobic oil phase was exactly as in Example 1. The emulsifying agent in the emulsion was sodium stearate (soap), used in approximately the same amount as the sodium petroleum sulphonate of Example 1 (i.e. 1.2 g/l).

The starting emulsion was prepared in the same way as in Example 1 with the additional step of stearic acid (1.2 g/l) neutralization being carried out on the melt with the addition of 0.6 g caustic lye (30%) before addition of 50 ml distilled water.

The resulting oil-in-water emulsion was added to 1 liter distilled water under stirring and destabilisation took place by addition of calcium acetate (500 ppm calcium).

Floc formation was very good, as in Example 1.
All the paints reported in Example 1 were tested.
In all the cases the results were
very good dispersion
very good detackification
almost 100% flotation (only trace sedimentation with the primer and the red acrylic paint)
clear solutions
no foam (or slight foam formation)

Again, results compared favorably with those obtained by the bentonite/clay base product.

EXAMPLE 6

In this example, a concentrated emulsion was added to 1 liter water as described above. The emulsion consisted of an acrylic-acrylonitrile copolymer in an anionic aqueous emulsion (acrylic-acrylonitrile latex commercially available as Acronal 35D from B.A.S.F.).

This emulsion was added at a rate of 2 g/l and was destabilised by the addition of a quaternary ammonium surfactant (benzalkonium chloride, commercially available as Arquad B50 from Akzo), used at a concentration of 0.3 g/l. Paints tested were the same five reported in Example 1, and furthermore
a water based automotive base coat (manufactured by IDAC)
an acrylic clearcoat (IDAC)

Floc formation and flotation were very good, and a compact and collectable raft was produced. In all the cases the results were:
very good dispersion
excellent detackification
almost total flotation, with very coherent, compact sludge
clear to hazy solution (solution was slightly hazy with the water based coat)
minimal foam

EXAMPLE 7

As in Example 6, but detackification was effected by means of addition of aluminium chlorohydrate, 50% solution, (commercially available from Albright & Wilson) added at a rate of 0.2 g/l (for the water-based base coat, addition rate was 0.4 g/l).

The same number of paints as in Example 6 have been tested, with the same results. Solutions were clearer and the flocs slightly more dispersed.

EXAMPLE 8

A concentrated emulsion of a carboxylated butadiene in a synthetic anionic aqueous emulsion (commercially available as 78P40 from Doverstrand) was added to 1 liter of water at the rate of 2 g/l. Destabilisation of the emulsion was then effected by adding either one of the following compounds:

1) 0.3 g/l of a quaternary ammonium surfactant (benzalkonium chloride, commercially available as Arquad B50 from Akzo) or a tetra decyltrimethyl ammonium bromide (commercially available at Querton 14Br40 from Berol Nobel).

2) 0.25 g/l of a 50% aluminium chlorhydrate solution.

Paints tested were red acrylic (BASF) and in (2) also water based basecoat (IDAC).

Results obtained were similar to those in example 7.

EXAMPLE 9

A styrene butadiene copolymer in a fatty acid soap emulsion (commercially available as 26W10 from Doverstrand) was added to 1 liter of water at a rate of 2g/l. The emulsion was destabilised by:

1) The addition of 0.10 g/l Arquad B50 (as in Example 8 above).
2) Increasing the pH of the water to 10–12 with either sodium hydroxide or potassium hydroxide.

EXAMPLE 10

A high modulus natural rubber latex emulsion (commercially available as Revultex HR from Revertex) was added to 1 liter of water in an amount of 2 g/l.

Destabilisation of the emulsion was then effected by adding either one of the following compounds:

1) 0.6 g/l of quarternary ammonium compound (Querton 14Br40 in Example 8) or 0.3g/l of Atquad B50.
2) Increasing the pH of the water to 9–10 using sodium hydroxide.

EXAMPLE 11

A carboxylated acrylic copolymer emulsion (commercially available as Acrymul AM355 from Protex Chemicals) was added to 1 liter of water, as in the previous examples in an amount of 2 g/l. Destabilisation of the emulsion was then effected by adding 0.5 g/l of a quarternary ammonium compound (Querton 14Br40 as in Example 8).

The detackifying compositions of examples 8 to 11 were tested using red acrylic paint (BASF). Results obtained were good, similar to those for example 7.

We claim:

1. A process for detackifying paint comprising contacting an oil-in-water emulsion with an aqueous solution whereby the oil-in-water emulsion is destabilised; then contacting paint with the aqueous solution comprising the destabilised oil-in-water emulsion so that the paint is adsorbed onto destabilised emulsion particles.

2. A process according to claim 1 in which the emulsion comprises an emulsifying agent and destabilisation of the emulsion is effected by reducing the activity of the emulsifying agent.

3. A process according to claim 2 in which the emulsifying agent is water-soluble and ionic and destabilisation takes place by contact with ions of the opposite charge in an amount sufficient to destabilise the emulsion.

4. A process according to claim 3 in which the emulsifying agent is anionic and will form an insoluble salt with a metal ion selected from the group calcium, magnesium and aluminium ions and mixtures thereof, and the aqueous solution has sufficient content of said metal ion to form an insoluble salt with the anionic emulsifying agent.

5. A process according to claim 4 in which the aqueous solution is tap water whose hardness ions constitute the metal ion content.

6. A process according to claim 2 in which the emulsifying agent is anionic and destabilisation is effected by contact with a cationic component selected from the group cationic emulsifying agents and cationic polymers and mixtures thereof, in the aqueous solution.

7. A process according to claim 2 in which the emulsifying agent is cationic and destabilisation is effected by contact with an anionic component selected from the group polymers, soaps, surfactants and mixtures thereof, in the aqueous solution.

8. A process according to claim 2 in which the emulsifying agent is anionic and the emulsion is destabilised by lowering the pH by at least 0.5 units.

9. A process according to claim 1 in which the aqueous solution is circulating in a paint spray booth.

10. A process according to claim 1 in which the hydrophobic oil phase to be emulsified is selected from the group waxes, paraffins, stearines which are solid at room temperature, and mixtures thereof.

11. A process according to claim 1 in which the oil phase has a melting point of above 60° C.

12. A process according to claim 10 in which the oil phase has a melting point of above 80° C.

13. A process according to claim 1 in which the hydrophobic phase comprises up to 30% of a mineral oil or naturally occurring oil.

14. A process according to claim 1 in which the oil-in-water emulsion comprises a latex.

15. A process according to claim 1 in which the weight ratio of hydrophobic phase to emulsifying agent is in the range from 5:95 to 99:1.

16. A process according to claim 14 in which the said weight ratio is in the range of from 5:1 to 1:5.

17. A process according to claim 1 in which the oil-in-water emulsion is a concentrated emulsion having a weight ratio of hydrophobic phase to aqueous phase of from 1:5 to 5:1.

18. A process according to claim 16 in which the said weight ratio is in the range of from 1:2 to 2:1.

19. A process according to claim 1 in which the oil-in-water emulsion is formed in a preliminary step by contact of an emulsifiable hydrophobic phase with aqueous solution.

20. A process for detackifying paint comprising contacting an oil-in-water emulsion, comprising a dispersed phase selected from the group waxes, paraffins, stearines which are solid at room temperature, and mixtures thereof and an anionic emulsifying agent, with an aqueous solution containing a metal ion selected from the group calcium, magnesium and aluminium ions and mixtures thereof, whereby the oil-in-water emulsion is destabilised; then contacting paint with the aqueous solution comprising the destabilised oil-in-water emulsion so that the paint is adsorbed onto destabilised emulsion particles.

21. A process for detackifying paint comprising contacting a latex which comprises an anionic emulsifier with an aqueous solution containing cationic component selected from the group cationic emulsifying agents and cationic polymers, a metal ion selected from the group calcium, magnesium and aluminium ions and mixtures thereof, whereby the oil-in-water emulsion is destabilised; then contacting paint with the aqueous solution comprising the destabilised oil-in-water emulsion so that the paint is adsorbed onto destabilised emulsion particles.

* * * * *